United States Patent
Kim et al.

(10) Patent No.: US 9,332,108 B2
(45) Date of Patent: May 3, 2016

(54) APPARATUS AND METHOD FOR CONTROLLING APPLICATION IN WIRELESS TERMINAL

(75) Inventors: Min-Ji Kim, Seoul (KR); Yong-Soo Jeong, Seoul (KR); Jin Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 52 days.

(21) Appl. No.: 13/267,070

(22) Filed: Oct. 6, 2011

(65) Prior Publication Data

US 2012/0088478 A1 Apr. 12, 2012

(30) Foreign Application Priority Data

Oct. 11, 2010 (KR) .................. 10-2010-0099005

(51) Int. Cl.
*G06F 3/048* (2013.01)
*H04W 4/00* (2009.01)
*H04M 1/725* (2006.01)

(52) U.S. Cl.
CPC ...... *H04M 1/72525* (2013.01); *H04M 1/72544* (2013.01); *H04M 1/72586* (2013.01)

(58) Field of Classification Search
CPC ............ G06F 3/04817; G06F 3/0482; H04M 1/72583
USPC ................................. 715/700, 864
See application file for complete search history.

(56) References Cited

U.S. PATENT DOCUMENTS

| | | | | |
|---|---|---|---|---|
| 7,698,435 | B1* | 4/2010 | Paterik | H04M 3/493 370/352 |
| 8,391,843 | B2* | 3/2013 | Lee | H04M 1/72583 455/412.1 |
| 8,589,373 | B2* | 11/2013 | Mayer | G06F 17/30864 439/152 |
| 2002/0078025 | A1* | 6/2002 | Tanaka | G06F 17/30699 |
| 2004/0162738 | A1* | 8/2004 | Sanders | G06Q 50/188 705/80 |
| 2004/0255289 | A1* | 12/2004 | Alex George | G06F 9/4445 717/174 |
| 2005/0125736 | A1* | 6/2005 | Ferri | G06F 3/0481 715/747 |
| 2005/0210035 | A1* | 9/2005 | Kester | G06F 11/3476 |

(Continued)

FOREIGN PATENT DOCUMENTS

| | | |
|---|---|---|
| CN | 101566920 A | 10/2009 |
| EP | 1416750 A1 | 5/2004 |
| EP | 1959337 A1 | 8/2008 |

OTHER PUBLICATIONS lifehacker.com "a Guide to organizing your android home screen", available Aug. 17, 2010 pp. 1-7 http://lifehacker.com/5610032/a-guide-to-organizing-your-android-home-screen.*

(Continued)

*Primary Examiner* — Scott Baderman
*Assistant Examiner* — Mario M Velez-Lopez
(74) *Attorney, Agent, or Firm* — Cha-Reiter, LLC.

(57) ABSTRACT

An apparatus and method for controlling an application in a wireless terminal to automatically download an application on a home screen classified on a category basis. The apparatus preferably includes a display unit for displaying home screens set to categories and a controller for automatically matching and setting the home screens of the wireless terminal to categories received from a server in a home screen category setting mode and downloading an application on a home screen set to a category of the application.

13 Claims, 6 Drawing Sheets

(56) References Cited

U.S. PATENT DOCUMENTS

| | | | | |
|---|---|---|---|---|
| 2005/0277432 | A1* | 12/2005 | Viana | H04M 1/72525 455/466 |
| 2006/0184934 | A1* | 8/2006 | Karlberg | H04M 1/72525 717/178 |
| 2006/0288371 | A1* | 12/2006 | Jun | H04M 1/72522 725/52 |
| 2008/0034314 | A1* | 2/2008 | Louch | G06F 3/0481 715/778 |
| 2008/0153473 | A1* | 6/2008 | Lorenzo | G06F 3/0482 455/418 |
| 2008/0168368 | A1* | 7/2008 | Louch | G06F 3/048 715/764 |
| 2009/0021486 | A1* | 1/2009 | Chaudhri | G06F 9/4443 345/173 |
| 2009/0077041 | A1* | 3/2009 | Eyal | G06F 17/30038 |
| 2009/0204925 | A1* | 8/2009 | Bhat | G06F 1/1626 715/778 |
| 2009/0228824 | A1* | 9/2009 | Forstall | G06F 3/04817 715/779 |
| 2009/0240638 | A1* | 9/2009 | Kirpal | G06F 17/30887 706/12 |
| 2009/0240670 | A1* | 9/2009 | Tiyyagura | G06F 17/30 |
| 2009/0271783 | A1 | 10/2009 | Hsieh et al. | |
| 2010/0087184 | A1* | 4/2010 | Stoev | G06F 8/65 455/422.1 |
| 2010/0295789 | A1* | 11/2010 | Shin | G06F 1/1626 345/168 |
| 2011/0145920 | A1* | 6/2011 | Mahaffey | G06F 21/564 726/22 |
| 2011/0185283 | A1* | 7/2011 | Jun | H04M 1/72572 715/745 |
| 2011/0270691 | A1* | 11/2011 | Park | G06Q 30/02 705/14.73 |
| 2012/0088478 | A1* | 4/2012 | Kim | H04M 1/72525 455/414.2 |
| 2012/0089484 | A1* | 4/2012 | Kumar | G06Q 30/0623 705/26.61 |
| 2012/0096396 | A1* | 4/2012 | Ording | G06F 9/4443 715/799 |
| 2012/0240236 | A1* | 9/2012 | Wyatt | G06F 21/564 726/25 |
| 2013/0219335 | A1* | 8/2013 | Zhang | G06F 9/4443 715/810 |

OTHER PUBLICATIONS

Microsoft.com, "How to Arrange or Move Icons on the Desktop", Jan. 1, 2008, pp. 1-2 http://support.microsoft.com/kb/289587.*

Kang et al. "Capture, Annotate, Browse, Find, Share: Novel Interface for personal Photo Management", pp. 315-337 on the International Journal of Human-Computer Interaction, published 2007.* androidpolice.com "Exclusive: New Android 2.2 Features Exposed!," May 23, 2010, pp. 1-7 http://www.androidpolice.com/2010/05/20/exclusive-new-android-2-2-features-exposed-update-all-auto-update-apps-speed-boost-tethering-flash-color-trackball-car-dock-improvements-with-pics/.* superuser.com "Automatically sort music files into folders by album/artist names" Aug. 23, 2010, pp. 1-2 http://superuser.com/questions/171052/automatically-sort-music-files-into-folders-by-album-artist-names.*

Deleting unwated homescreens, May 2010, pp. 1-4 http://androidforums.com/samsung-galaxy-portal/79665-deleting-unwanted-homescreens.html.*

* cited by examiner

APPARATUS AND METHOD FOR CONTROLLING APPLICATION IN WIRELESS TERMINAL

CLAIM OF PRIORITY

This application claims the benefit of priority under 35 U.S.C. §119(a) from a Korean Patent Application filed in the Korean Intellectual Property Office on Oct. 11, 2010 and assigned Serial No. 10-2010-0099005, the entire disclosure of which is hereby incorporated by reference in its entirety.

BACKGROUND OF THE INVENTION

1. Field of the Invention

The present invention generally relates to an apparatus and method for controlling an application in a wireless terminal. More particularly, the present invention relates to an apparatus and method for controlling an application in a wireless terminal to automatically download an application on a home screen.

2. Description of the Related Art

With the recent development of electronic engineering and communications, wireless terminals are now equipped with various functions. In other words, as wireless communication and data processing technologies have rapidly developed, wireless terminals are used not only for voice communication but also other functions such as Internet services, video communication, and moving picture message transmission, through wireless terminals.

With the widespread use of wireless terminals, a huge amount of communication occurs in human relations through the wireless terminals. In this regard, wireless terminals have been recognized as indispensable communication means for the modern life.

In line with the development of wireless terminals, services provided through the wireless terminals and applications processed in the wireless terminals are also increasing and becoming more diversified.

At present, if an application is downloaded into a wireless terminal, the downloaded application is stored and the display of the downloaded application appears on a menu screen in an order in which it is downloaded.

A user of the wireless terminal selects a frequently used application from among a number of applications currently displayed on the menu screen, and can move the selected application to a corresponding one of a plurality of home screens of the wireless terminal to display the application on the home screen.

In order to move a desired application to and display it on a home screen of the wireless terminal, the user has to experience a cumbersome process of downloading the application, entering a menu screen on which the application is downloaded, selecting the application on the menu screen, and moving the selected application to the home screen.

SUMMARY OF THE INVENTION

Accordingly, an exemplary aspect of the present invention is to provide an apparatus and method for controlling an application in a wireless terminal to automatically download an application on a home screen classified on a category basis.

Another exemplary aspect of the present invention is to provide an apparatus and method for controlling an application in a wireless terminal to update applications simultaneously that are displayed on a particular home screen set for a corresponding category.

Another exemplary aspect of the present invention is to provide an apparatus and method for controlling an application in a wireless terminal to delete an application selected on a home screen set for a corresponding category or to delete the set home screen.

According to another exemplary aspect of the present invention, there is provided an apparatus for controlling an application in a wireless terminal. The apparatus preferably includes a display unit for displaying a plurality of home screens set to one or more categories out of a plurality of categories and a controller for automatically matching and setting the home screens of the wireless terminal to categories received from a server in a home screen category setting mode and downloading an application on a home screen set to a category of the application. The display unit may display one or more of a plurality of home screens set to at least one category out of a plurality of categories; and the controller may automatically match and set the home screens of the wireless terminal to the categories received from a server in a home screen category setting mode and download a particular application for display on a home screen set to a particular category of the application.

According to another exemplary aspect of the present invention, there is provided a method for controlling an application in a wireless terminal. The method preferably includes automatically matching and setting the home screens of the wireless terminal to categories received from a server in a home screen category setting mode and downloading an application for display on a home screen set to a category of the application.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION

Hereinafter, an exemplary embodiment of the present invention will be described in detail with reference to the accompanying drawings. Throughout the drawings, like components will be indicated by like reference numerals.

While a description will be made regarding an application in an exemplary embodiment of the present invention, it can also be equally applied to a Graphic User Interface (GUI) widget.

Figure 1:
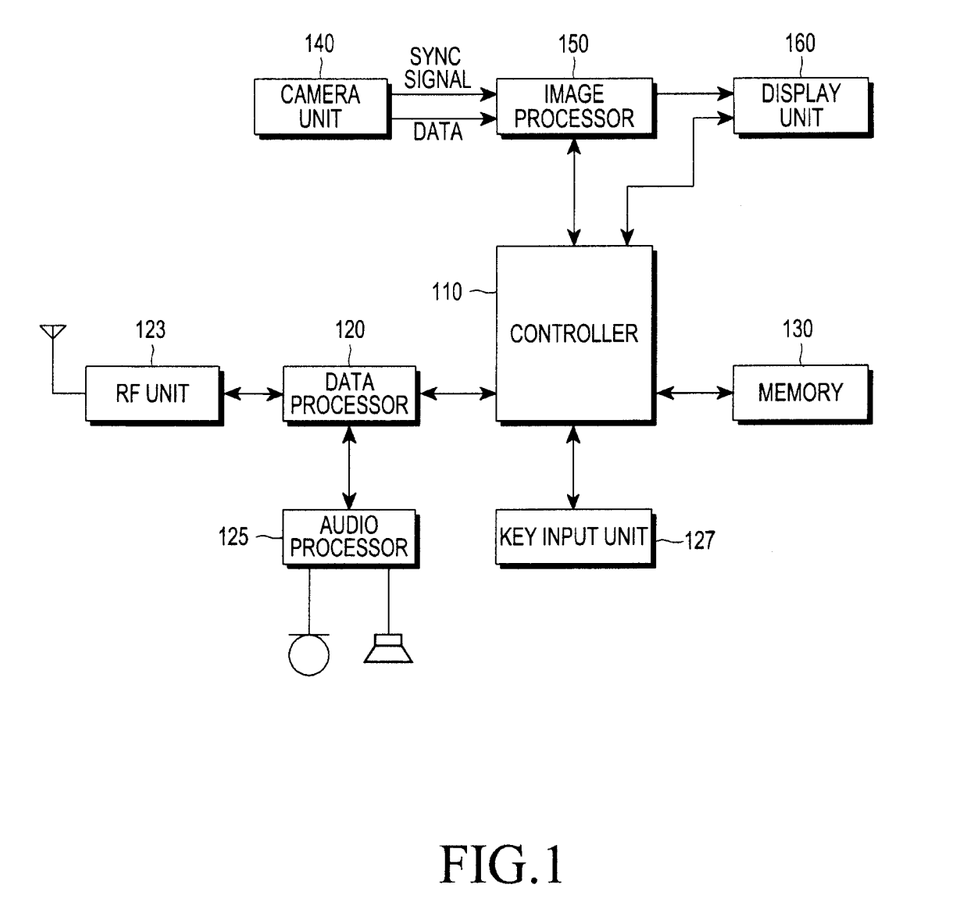
FIG. 1 is a block diagram of a wireless terminal according to an exemplary embodiment of the present invention.

FIG. 1 is a block diagram of a wireless terminal according to an exemplary embodiment of the present invention.

Referring now to FIG. 1, a Radio Frequency (RF) unit 123 performs a wireless communication function of the portable terminal. The RF unit 123 preferably includes a transceiver or an RF transmitter for up-converting a frequency of a transmission signal and amplifying the transmitted signal and an RF receiver for low-noise amplifying a received signal and down-converting the frequency of the received signal. A data processor 120 includes a transmitter for encoding and modulating the transmission signal and a receiver for demodulating and decoding the received signal. In other words, the data processor 120 may include a modem and a codec for processing. Herein, the codec preferably includes a data codec for processing packet data and an audio codec for processing an audio signal such as voice. An audio processor 125 reproduces an audio signal being output from the audio codec of the data processor 120 or transmits an audio signal generated from a microphone to the audio codec of the data processor 120.

A key input unit 127 preferably includes keys for inputting numeric and character information and function keys for setting various functions. The key input can be a QWERTY key input, alpha-numeric keypad, Dvorak, etc., just to name some of the possible configurations.

A memory 130 includes program and data memories. The program memory stores programs for controlling a general operation of the wireless terminal.

The program memory according to an exemplary embodiment of the present invention may include a non-transitory machine readable medium in order to store a program for automatically matching and setting a home screen of the wireless terminal to a corresponding category received from a server or manually matching and setting the home screen to the corresponding category by a user.

The program memory according to an exemplary embodiment of the present invention may include a non-transitory machine readable medium to store a program for downloading an application on a home screen set for a category of the application.

The program memory according to an exemplary embodiment of the present invention may include a non-transitory machine readable medium to store a program for updating or deleting an application on a home screen set for a corresponding category.

A controller 110, which can be a processor or microprocessor, controls overall operation of the wireless terminal.

According to an exemplary embodiment of the present invention, in a home screen category setting mode, upon receiving a category tree from a server at the request of the wireless terminal, the controller 110 automatically matches and sets home screens of the wireless terminal to categories of the category tree received from the base station or server.

According to an exemplary embodiment of the present invention, in the home screen category setting mode, the controller 110 manually matches, modifies, deletes, and adds the home screens of the wireless terminal and the categories by using the category tree received from the server.

According to an exemplary embodiment of the present invention, in the home screen category setting mode, if an already downloaded application exists in the wireless terminal, the controller 110 may analyze a category of the application and move the display of the application to a particular home screen set to the category of the application to display the application on the home screen.

According to an exemplary embodiment of the present invention, the controller 110 extracts category information from meta data of an application when downloading the application, and if the category information does not exist in the meta data of the application, the controller 110 extracts upper directory information from Uniform Resource Locator (URL) information of the application as the category information.

According to an exemplary embodiment of the present invention, the controller 110 downloads the application on a home screen matched to the extracted category information, and if the home screen matched to the extracted category information does not exist, the controller 110 downloads the application on a home screen set for a category "Other".

According to an exemplary embodiment of the present invention, the controller 110 may also manually move the application downloaded on the home screen set to the miscellaneous/unclassified category "Other" to a corresponding home screen by the user for display on the corresponding home screen.

According to an exemplary embodiment of the present invention, upon occurrence of application update on a particular home screen set to a particular category, the controller 110 may also simultaneously update other applications displayed on the particular home screen.

According to an exemplary embodiment of the present invention, upon selection of application deletion on the home screen set to the category, the controller 110 may simultaneously delete selected applications displayed on the home screen, and upon selection of home screen deletion on the home screen set to the category, the controller 110 may delete the display of a particular application or applications from a particular home screen, and can even delete the particular home screen.

When the selected applications are deleted on the display of a particular home screen, the number of home screens set on a category basis is maintained.

While setting of a category to a home screen is discussed in an exemplary embodiment of the present invention, a category may also be set to a folder or an application folder of the home screen to perform the same function as in case of the home screen.

Therefore, the controller 110 may automatically match a folder of the home screen or an application folder to a category and automatically download the application in the matched folder or application folder based on category information of the application. The controller 110 may also update or delete applications downloaded in a folder or an application folder.

A camera unit 140 captures an image, and may include a camera sensor for converting an optical signal of the captured image into an electrical signal, and a signal processor for converting an analog image signal of the image captured by the camera sensor into digital data. Herein, it is assumed that the camera sensor comprises a Charge Coupled Device (CCD) sensor or a Complementary Metal Oxide Semiconductor (CMOS) sensor, and the signal processor may be implemented as a Digital Signal Processor (DSP). In addition, the camera sensor and the signal processor may be implemented as one piece or separately.

An image processor 150 performs Image Signal Processing (ISP) to display an image signal output from the camera unit 140 on the display unit 160. The ISP preferably executes functions including but not limited to gamma correction, interpolation, space conversion, image effect, image scale, Auto White Balance (AWB), Auto Exposure (AE) and Auto Focus (AF). Thus, the image processor 150 processes the image signal output from the camera unit 140 in the unit of a frame, and outputs frame image data adaptively to the features and size of the display unit 160. A person of ordinary skill in the art also should understand and appreciate that according to the claimed invention a display unit may include or comprise a projection means to project the images onto an external screen or even a wall for viewing.

The image processor 150 preferably includes an image codec, and compresses the frame image data displayed on the display unit 160 in a preset manner or restores the compressed frame image data to the original frame image data. Herein, the image codec may be Joint Picture Experts Group (JPEG) codec, Moving Picture Experts Group 4 (MPEG4) codec, or Wavelet codec. The image processor 150 preferably has an on screen display (OSD) function, and may output OSD data according to the displayed picture size under the control of the controller 110.

With continued reference to FIG. 1, the display unit 160 displays an image signal output from the image processor 150 on the screen and displays user data output from the controller 110. Herein, the display unit 160 may be a Liquid Crystal Display (LCD), and in this case, the display unit 160 may include an LCD controller, a memory capable of storing image data, an LCD element, and so on. When the LCD is implemented with a touch screen, it may serve as an input unit. In this particular case, on the display unit 160, keys such as the key input unit 127 may be displayed. A person of ordinary skill in the can appreciate that in the present invention, the display unit make comprise a, LCD, LED, OLED, or virtually any other type of thin film technology display.

According to an exemplary embodiment of the present invention, the display unit 160 may also display home screens of the wireless terminal set for categories and applications associated with the home screens.

With reference now to FIGS. 2 through 7, a detailed description will now be made of an exemplary process of controlling an application in the above-described wireless terminal according to the present invention.

Figure 2:
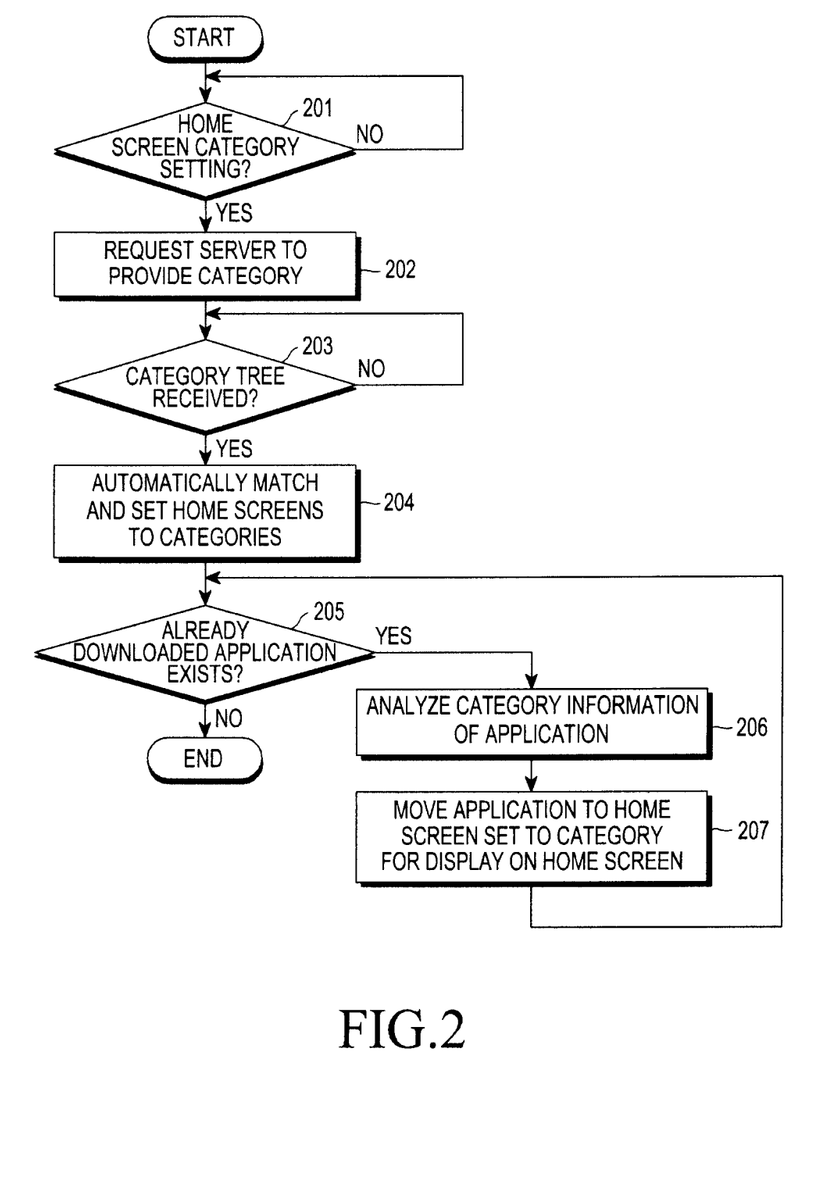
FIG. 2 is a flowchart illustrating a process of setting a category on a home screen in a wireless terminal according to an exemplary embodiment of the present invention.

FIG. 2 is a flowchart illustrating an exemplary operational process of setting a category for a home screen in a wireless terminal according to an embodiment of the present invention.

With reference to FIG. 2 together with FIG. 1, an exemplary embodiment of the present invention will be described in detail.

At step 201, when the home screen category setting is selected in a wireless terminal, the controller 110 senses the selection and switches the wireless terminal to a home screen category setting mode.

In the home screen category setting mode, at step 202 the controller 110 requests an application providing server or base station to provide a category.

Upon reception of a category tree at step 203 from the application providing server, the controller 110 at step 204 generates home screens of the wireless terminal to correspond to the number of categories of the category tree received from the server, and automatically matches and sets the home screens to the categories received from the server.

After the controller 110 automatically matches and sets the home screens of the wireless terminal to the categories in step 204, the controller 110 may modify or delete a category set for a home screen according to manual modification or deletion by a user.

In the home screen category setting mode, the home screens and the categories may also be manually matched and set by the user as well as being automatically matched and set.

In other words, in the home screen category setting mode, the user may manually match and set the home screens to the categories by using the category tree received from the server.

Figure 5:
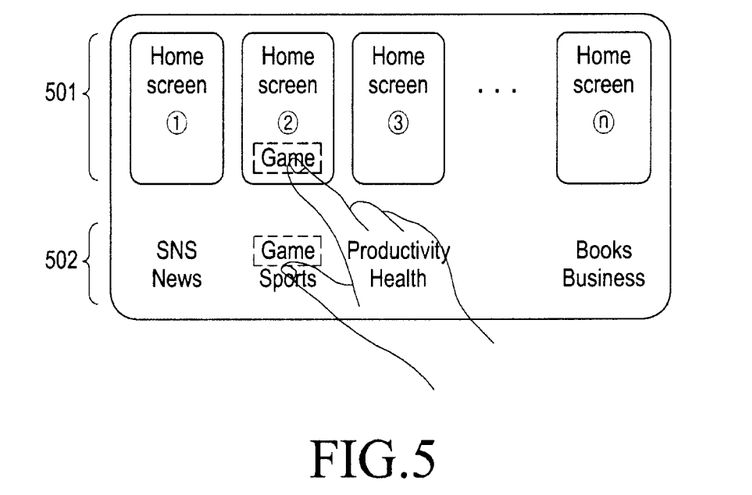
FIG. 5 is a diagram illustrating a process of manually matching and setting home screens to categories in a wireless terminal according to an exemplary embodiment of the present invention.

FIG. 5 is a diagram illustrating a process of manually matching and setting home screens to categories in a wireless terminal according to an exemplary embodiment of the present invention.

As shown in FIG. 5, the user may set a category "Game" among categories 502 downloaded from the server to a home screen (2) from among a plurality of home screens 501 by dragging the category "Game" onto the home screen (2).

After setting home screens of the wireless terminal to categories, the controller 110 determines at step 205 whether or not an already downloaded application exists in the wireless terminal. If the controller 110 senses the existence of an already-downloaded application in the wireless terminal, then at step 206 the controller 110 analyzes category information of the application in step 206.

With continued reference to the flowchart in FIG. 2, at step 207 the controller 110 moves the application to a home screen set to a category of the application to display the application on the home screen.

Figure 3:
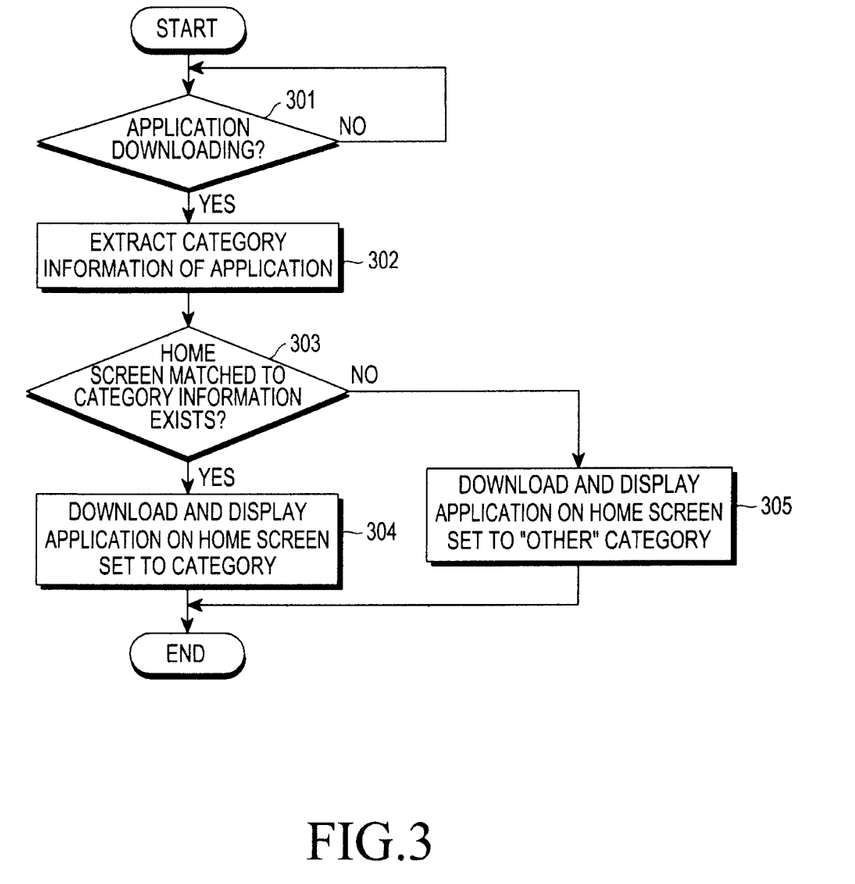
FIG. 3 is a flowchart illustrating a process of downloading an application in a wireless terminal according to an exemplary embodiment of the present invention.

After home screens of the wireless terminal are set to categories in the home screen category setting mode as shown in FIG. 2, an application is downloaded on a corresponding home screen according to category information of the application as shown in the flowchart of FIG. 3.

FIG. 3 is a flowchart illustrating an exemplary process of downloading an application in a wireless terminal according to an exemplary embodiment of the present invention.

With reference to FIGS. 1 and 3, another exemplary aspect of the present invention will now be described in more detail.

Referring now to FIG. 3, at step 301 once application downloading is selected in a wireless terminal, the controller 110 senses the selection and at step 302 extracts category information of the downloaded application.

At step 302, the controller 110 may extract category information of the application from meta data included in the application.

However, if at step 302 the category information of the application does not exist in the meta data included in the application, the controller 110 extracts upper directory information from URL information of the application as the category information.

Upon the case in which the category information is extracted in step 302, the controller 110 determines whether or not a home screen set to a category matched to the extracted category information exists.

At step 303, the controller 110 senses the existence of a home screen set to the matched category, and downloads and displays the application on the home screen set to the matched category at step 304.

Figure 6:
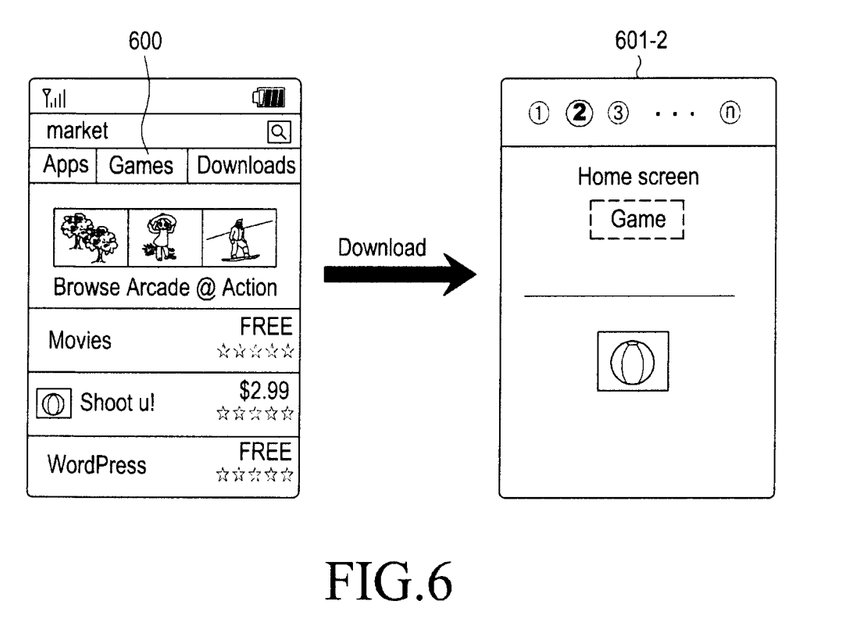
FIG. 6 is a diagram illustrating an application downloading process in a wireless terminal according to an exemplary embodiment of the present invention.

FIG. 6 is a diagram illustrating a process of downloading an application 600 for display on a particular home screen at step 304.

As shown in FIG. 6, upon selection of downloading of an application "Shoot u!", the application "Shoot u!" is downloaded and displayed on the home screen (601-2) matched to category information "Game" of the application "Shoot u!".

However, if there is no home screen set to the matched category, the controller 110 senses the absence of such in step 303 and downloads and displays the application on a home screen set for a miscellaneous or uncategorized category labeled "Other" in this particular embodiment in step 305.

The home screen set to the category "Other" may be set by the user or may be automatically set as a default home screen.

The application downloaded on the home screen set to the category "Other" in step 305 may also be manually moved to and displayed on another home screen by the user.

Figure 4:
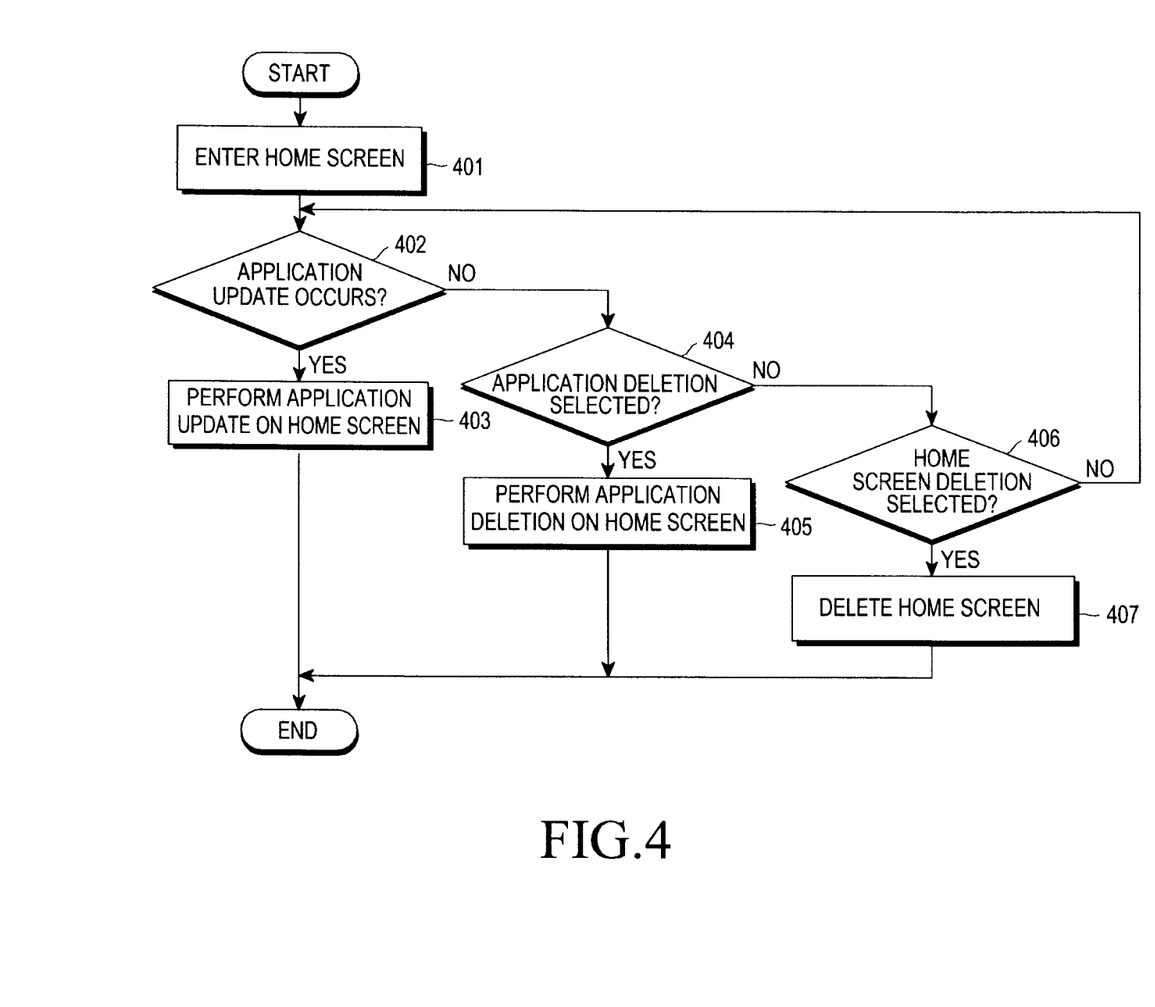
FIG. 4 is a flowchart illustrating an updating or deleting process on a home screen set for a corresponding category in a wireless terminal according to an exemplary embodiment of the present invention.

FIG. 4 is a flowchart illustrating an updating or deleting process on a home screen set to a category in a wireless terminal according to an exemplary embodiment of the present invention.

With reference to FIG. 4 together with FIG. 1, an exemplary embodiment of the present invention will now be described in more detail.

Referring to FIG. 4, at step 401 on a home screen among a plurality of home screens set to categories, if application update for at least one of applications downloaded on the home screen occurs, the controller 110 at step 402 senses the occurrence of the update and informs the user of the occurrence of application update on the home screen.

If the user selects the application update, the controller 110 senses the selection and at step 403 simultaneously performs application update on the corresponding applications on the home screen.

If at step 401, the application deletion for an application selected from the applications downloaded on the home screen or for all of the applications downloaded on the home screen, the controller 110 senses the selection in step 404 and then at step 405 simultaneously performs application deletion on the selected application or all of the downloaded applications on the home screen. Since only application deletion is being performed in step 405, the number of home screens set on a category basis is maintained.

If home screen deletion is selected in step 401, the controller 110 at step 406 senses the selection and at step 407 deletes the home screen.

Figure 7:
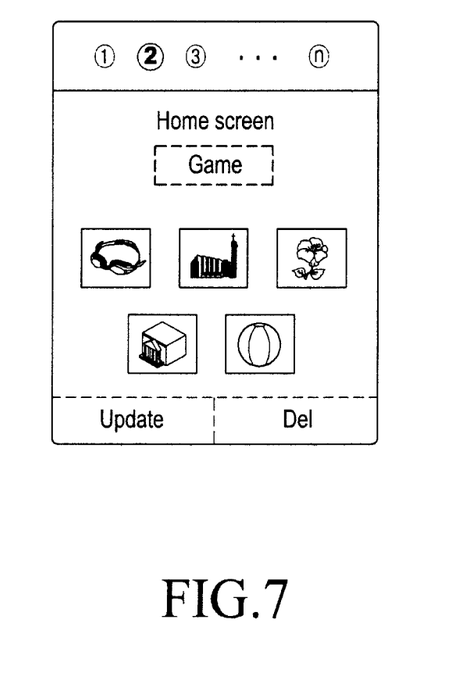
FIG. 7 is a diagram illustrating a process of updating or deleting an application on a home screen in a wireless terminal according to an exemplary embodiment of the present invention.

FIG. 7 is a diagram illustrating an update or deletion on the home screen described with reference to FIG. 4, in which applications downloaded on the home screen (2) set to the category "Game" are displayed.

Also on the home screen (2) are displayed an update soft key "Update" selectable by the user to perform update for the downloaded applications and a deletion soft key "Del" selectable by the user to perform deletion for the selected applications or all of the downloaded applications.

While a description has been made regarding setting of a category to a home screen in the foregoing embodiment of the present invention, a category may also be set to a folder or an application folder of the home screen to perform the same function as in case of the home screen.

Therefore, category setting may be performed for a folder of the home screen or an application folder through the process shown in FIG. 2, and the application may be downloaded in a folder or an application folder set according to category information of the application through the process shown in FIG. 3.

Moreover, update or deletion may be performed on the application downloaded in the folder or the application folder through the process shown in FIG. 4.

As is apparent from the foregoing description, by providing an apparatus and method for controlling an application in a wireless terminal, a downloaded application may be displayed on a home screen set to a corresponding category, and update and deletion may be conveniently performed on an application on a home screen set to a corresponding category.

The above-described methods according to the present invention can be realized in hardware, firmware or as software or computer code that can be stored in a recording medium such as a CD ROM, an RAM, a floppy disk, thumbnail, a hard disk, or a magneto-optical disk or downloaded over a network and stored on a non-transitory machine readable medium, so that the methods described herein can be rendered in such software using a general purpose computer, or a special processor or in programmable or dedicated hardware, such as an ASIC or FPGA. As would be understood in the art, the computer, the processor, microprocessor (controller) or the programmable hardware include memory components, e.g., RAM, ROM, Flash, etc. that may store or receive software or computer code that when accessed and executed by the computer, processor or hardware implement the processing methods described herein.

While a detailed exemplary embodiment such as a wireless terminal has been described in the present invention, various changes may be made without departing from the scope of the present invention. Accordingly, the scope of the present invention should be defined by the claims and equivalents thereof, rather than the described embodiment.

What is claimed is:

1. A wireless terminal comprising:
   a display unit including a display screen configured to display at least one home screen of a plurality home screens set to a plurality of categories; and
   a controller comprising a microprocessor configured to automatically match and set the home screens of the wireless terminal to respective ones of the plurality of categories received from a server when the plurality of categories are received from the server and when an application is downloaded, display an icon corresponding to the downloaded application on a particular home screen set to a particular category of the application of the plurality of categories received,
   wherein the controller extracts category information from the application when downloading the application, and displays the icon of the downloaded application on the particular home screen matched to the extracted category information, and wherein the controller extracts the category information from metadata of the application, and
   when the category information does not exist in the metadata of the application, the controller extracts upper directory information from Uniform Resource Locator (URL) information of the application as the category information.

2. The wireless terminal of claim 1, wherein in response to user selection, the controller matches, modifies, deletes and adds the plurality of home screens and the categories by using the categories received from the server in a home screen category setting mode.

3. The wireless terminal of claim 1, wherein in an home screen category setting mode, when an already downloaded application exists in the wireless terminal, the controller analyzes a category of the application and displays an icon corresponding to the already downloaded application to particular home screen set to the particular category of the application to display the application on the particular home screen.

4. The wireless terminal of claim 1, wherein the controller extracts category information from the application when downloading the application, and when a home screen matched to the extracted category information does not exist, the controller displays the icon corresponding to the downloaded application on a home screen set for a miscellaneous/unclassified category.

5. The wireless terminal of claim 1, wherein
   the controller simultaneously performs an update on applications corresponding to icons displayed on the particular home screen when an application update occurs on the particular home screen set to the particular category;

the controller simultaneously performs a deletion of icons selected on the particular home screen when an application deletion is selected on the particular home screen set to the particular category; and the controller performs deletion on the particular the home screen when home screen deletion is selected on the particular home screen set to the particular category.

6. The wireless terminal of claim 1, wherein the controller automatically matches a folder or an application folder of the home screen to a corresponding category and automatically displays an icon corresponding to a downloaded application in a corresponding folder or a corresponding application folder according to category information of the application.

7. A method for controlling an application in a wireless terminal, the method comprising:

automatically matching and setting a plurality of home screens of the wireless terminal by a controller to respective ones of a plurality of categories received from a base station or server when the plurality of categories are received from the server;

extracting category information by the controller from the application and metadata of the application when downloading the application; and displaying by the controller an icon corresponding to a downloaded application on a particular home screen of a display unit matched to a particular category of the application of the plurality of categories received when an application is downloaded, wherein the extracting of the category information comprises:

when the category information does not exist in the metadata of the application, extracting by the controller an upper directory information from Uniform Resource Locator (URL) information of the application as the category information.

8. The method of claim 7, wherein the setting comprises:

requesting by the controller to the base station or server to provide the plurality of categories in a home screen category setting mode; and receiving the plurality categories from the base station or server.

9. The method of claim 7, wherein the setting comprises the controller performing matching, modifying, deleting and adding the plurality of home screens and the respective categories in response to user-selection for the plurality of categories received from the base station or server in a home screen category setting mode.

10. The method of claim 7, wherein the setting comprises:

determining by the controller in a home screen category setting mode whether an already downloaded application exists in a memory of the wireless terminal;

analyzing by the controller a category of the application when the application exists; and displaying an icon corresponding to the already downloaded application for display on a home screen set to the category of the application.

11. The method of claim 7, wherein the downloading further comprises the controller displaying the icon corresponding to the downloaded application for display on a home screen set to a miscellaneous/unclassified category when the controller determines that there is no home screen matched to an extracted category information.

12. The method of claim 7, further comprising:

the controller simultaneously performing an update on applications corresponding to icons on the particular home screen when an application update occurs on the particular home screen set to the particular category;

the controller simultaneously performing deletion on icons selected on the particular home screen when an application deletion is selected on the particular home screen set to the particular category; and performing deletion on the particular home screen when home screen deletion is selected on the particular home screen set to the particular category.

13. The method of claim 7, further comprising the controller automatically matching a folder or an application folder of the particular home screen to a corresponding category and automatically displaying an icon corresponding to the downloaded application to a corresponding folder or a corresponding application folder according to category information of the application.

* * * * *